United States Patent [19]

Meilahn

[11] Patent Number: 5,762,024
[45] Date of Patent: Jun. 9, 1998

[54] AQUACULTURE SYSTEM

[75] Inventor: David E. Meilahn, 7219 - 196th St. S.W., Apt. C-3, Lynnwood, Wash. 98036

[73] Assignee: David E. Meilahn, Lynnwood, Wash.

[21] Appl. No.: 634,069

[22] Filed: Apr. 17, 1996

[51] Int. Cl.$^6$ .................................................. A01K 61/00
[52] U.S. Cl. ........................................ 119/223; 119/211
[58] Field of Search ................................ 119/223, 226, 119/238, 239, 240, 208, 250, 211

[56] References Cited

U.S. PATENT DOCUMENTS

| | | |
|---|---|---|
| 3,116,712 | 1/1964 | Ogden et al. . |
| 3,653,358 | 4/1972 | Fremont . |
| 3,698,359 | 10/1972 | Fremont . |
| 3,704,687 | 12/1972 | Nohmura . |
| 3,716,025 | 2/1973 | Lawson . |
| 3,921,583 | 11/1975 | De Shores ................................. 119/250 |
| 4,003,338 | 1/1977 | Neff et al. ................................. 119/223 |
| 4,036,176 | 7/1977 | McCarty et al. . |
| 4,044,720 | 8/1977 | Fast . |
| 4,067,809 | 1/1978 | Kato ........................................... 210/169 |
| 4,116,164 | 9/1978 | Shabi et al. . |
| 4,141,318 | 2/1979 | MacVane et al. . |
| 4,198,924 | 4/1980 | Chapman . |
| 4,205,625 | 6/1980 | Muller-Feuga ............................. 112/2 |
| 4,300,477 | 11/1981 | Chapman . |
| 4,354,457 | 10/1982 | Knowles . |
| 4,365,938 | 12/1982 | Warinner .................................... 417/54 |
| 4,422,408 | 12/1983 | Pohlhausen . |
| 4,654,147 | 3/1987 | Bagley ....................................... 210/744 |
| 4,711,199 | 12/1987 | Nyman . |
| 4,716,854 | 1/1988 | Bourdon ..................................... 119/223 |
| 4,744,331 | 5/1988 | Whiffin ....................................... 119/223 |
| 4,749,493 | 6/1988 | Hicks ......................................... 210/617 |
| 4,798,168 | 1/1989 | Vadseth et al. . |
| 4,798,169 | 1/1989 | Rosén et al. . |
| 4,930,444 | 6/1990 | Vasile ......................................... 119/223 |
| 4,957,064 | 9/1990 | Koma . |
| 5,038,715 | 8/1991 | Fahs, II . |
| 5,092,268 | 3/1992 | Taylor . |
| 5,178,093 | 1/1993 | Reese et al. . |
| 5,193,481 | 3/1993 | Loverich et al. ........................... 119/223 |
| 5,227,055 | 7/1993 | Timmons .................................... 210/151 |
| 5,249,548 | 10/1993 | Dupuy ....................................... 119/243 |
| 5,353,745 | 10/1994 | Fahs, II ...................................... 119/226 |
| 5,397,466 | 3/1995 | Lin ............................................. 210/170 |
| 5,450,818 | 9/1995 | Caillouet ................................... 119/223 |

Primary Examiner—Paul J. Hirsch
Attorney, Agent, or Firm—Seed and Berry LLP

[57] ABSTRACT

An aquaculture system for growing aquatic animals such as fish and crustaceans is shown and described. A rigid-walled floating tank is positioned in a body of water, a volume of water being provided to the tank via a floating pump assembly that is positioned in the body of water external to the tank. An inlet of the pump assembly is movable and may be positioned in a desired location and depth of the body of water, such that clean water that is free of surface contaminants and that is at a selected temperature is provided to the tank. The introduction of new water to the tank displaces and discharges a volume of water from the tank, thereby renewing the oxygen source in the tank and removing dissolved waste products such as ammonia. Additional oxygen may be injected into the water at different locations via oxygen diffusers. The tank is designed to facilitate the collection of solid wastes in a bottom region of the tank, the solid waste being evacuated from the tank to be discharged from the system or treated, as desired. Multiple tanks are coupled together adjacent a central service platform which supports the various components of the aquaculture system, such that the system is independent of land and may be positioned at any desired location.

22 Claims, 13 Drawing Sheets

AQUACULTURE SYSTEM

TECHNICAL FIELD

This invention relates generally to aquaculture systems, and more particularly, to apparatus and a method for growing aquatic animals in a body of water.

BACKGROUND OF THE INVENTION

The increasing demand for aquatic animals such as fish, crustaceans and mollusks as a source of food, as well as concerns regarding overharvesting and potential contamination from pollution, have led to the growth and expansion of the aquaculture industry.

Currently available aquaculture systems are generally classified as open or closed. Open systems are typically created by building a net-pen in a body of water, such as a lake or stream. Closed systems generally recirculate the water in a closed tank, the water being pumped from the tank through a treatment cycle and back into the tank.

Such aquaculture systems, however, have several disadvantages. For example, open systems such as net-pens are open to the environment, making it difficult to control disease, contaminants, and temperature. Also, given the collection of solid waste beneath the net-pen, the open system may only be operated in a given location for a limited period of time before it must be moved. Closed systems, while convenient and self-contained, are expensive to construct and operate.

Accordingly, there is a need in the art for an improved aquaculture system, and particularly an aquaculture system that is more efficient than currently available systems. The present invention fulfills these needs, and provides further related advantages.

SUMMARY OF THE INVENTION

Briefly, the present invention provides an improved aquaculture system having at least one floating, rigid-wall tank positioned in a body of water. A floating pump assembly having a pump positioned in a pump well is provided in the body of water external to the tank, the pump assembly having an inlet and an outlet. The inlet is submersed in the body of water external to the tank, and may be positioned at a desired location and depth in the body of water. The pump draws water through the inlet and the pump well, and discharges it through the outlet into the tank, thereby displacing and discharging a volume of fluid from the tank. New water is therefore continuously being discharged into and out of the tank, thereby maintaining the level of oxygen in the water of the tank at a desired level, and removing dissolved waste, such as ammonia. By providing a submersible pump having an inlet that is positionable at a desired location and depth, it is possible to provide new water to the tank that is free of surface contaminants and that is at a desired temperature. Also, by providing a rigid-wall tank, the aquatic animals grow in a controlled, defined environment that is not deformed or altered by currents in the body of water.

In an alternative embodiment, an oxygen diffuser is submerged and coupled to a conduit extending between the inlet and the pump well to inject oxygen into the water as it is drawn towards the pump. By injecting the oxygen into pressurized sea water, higher absorption efficiency is achieved. Alternatively, oxygen diffusers are coupled to a conduit extending between the outlet of the pump assembly and the tank to inject oxygen into the water before it is discharged into the tank.

The tank has a cylindrical section that creates a primary zone wherein the aquatic animals live and grow. The tank also has a conical bottom surface that creates a quiet zone beneath the primary zone, which facilitates the collection of solid waste. The aquaculture system has a solid waste collection system that uses a conduit extending from the quiet zone in the bottom of the tank to a collection and settling tank. The waste may then either be discharged into the body of water external to the tank, or it may be passed through a waste treatment apparatus prior to being discharged into the body of water. The conduit has a transparent region adjacent the tank, such that the solid waste may be viewed as it flows through the conduit. In this manner, the operator may determine the quantity of uneaten food contained in the waste, and change the amount of food introduced into the tank, as appropriate.

In a preferred embodiment, several of the tanks are coupled together adjacent a central, floating service platform. The platform supports the various components of the aquaculture system, for example, by carrying fuel, generators, oxygen, waste treatment tanks and housing for personnel, as desired. The tanks and platform are anchored to the sea bed, the tanks having sufficient structural rigidity to withstand forces from currents in the body of water. The aquaculture system is therefore self-contained, and may be located at any desired location in a body of water.

These and other aspects of the present invention will become evident upon reference to the attached drawing and following detailed description.

DETAILED DESCRIPTION OF THE INVENTION

Aquaculture systems are used to grow aquatic animals such as fish, crustaceans and mollusks, to a size where they are marketable for different uses, primarily as a food product. Currently available aquaculture systems comprise net pens in naturally occurring bodies of water, or closed systems on land that use recirculating, treated water. An aquaculture system provided in accordance with a preferred embodiment of the present invention provides improved results by creating a defined, controlled environment for the aquatic animals and monitoring and adjusting the environment as necessary to optimize the health and growth of the animals. Contributing to these improved results are (1) the use of a rigid-wall tank to create a defined environment having solid boundaries that are not deformed by currents in the body of water; (2) the use of a pump well or plenum chamber that allows parameters of the water such as oxygen content and temperature to be measured prior to being discharged into the tank and which allows the rate of water to the tank to be adjusted as desired, given the type and stage of development of these species being grown; (3) discharging new water into a bottom region of the tank and discharging displaced water from an upper region of the tank, to create a good exchange of water and a variable speed current; and (4) drawing clean water from a location external to the tank which may be remote from the tank and may be at a selected depth, thereby allowing an operator to provide the species being grown with water that is free from surface contaminants and that is at a temperature selected according to the species and stage of growth.

Figure 1:
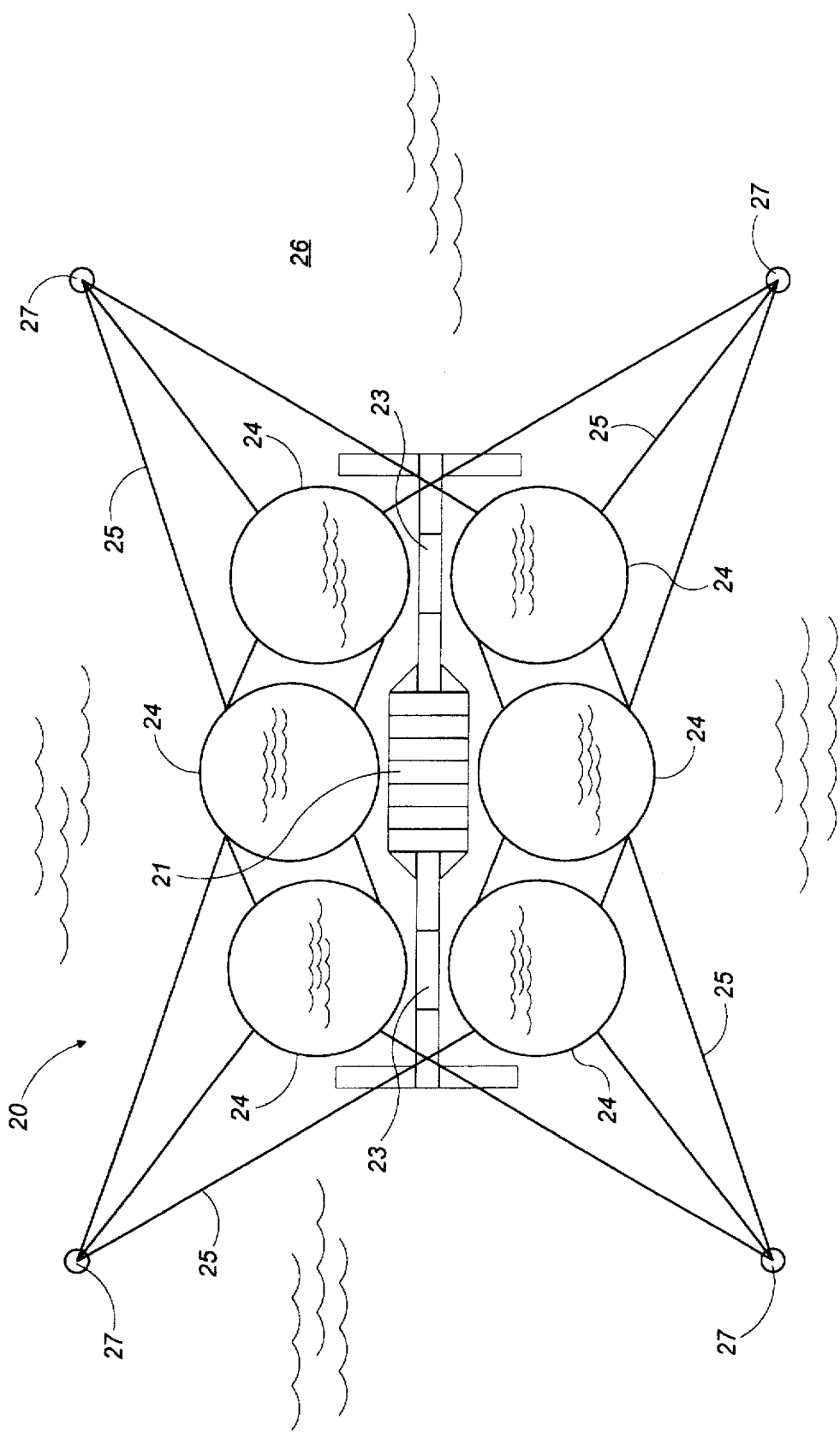
FIG. 1 is a schematic illustration of a top plan view of an aquaculture system provided in accordance with a preferred embodiment of the present invention.

More particularly, an improved aquaculture system 20 is provided in accordance with a preferred embodiment of the present invention, as illustrated in FIG. 1. Multiple floating tanks 24 are positioned in a body of water 26, which may be either salt or fresh water. The tanks 24 are coupled to each other adjacent a central, floating service platform 21. Extending from the service platform 21 are floating walkways 23 which allow access to the different tanks 24. Although the tanks may be sized to any desired configuration, in a preferred embodiment each of the tanks has an inner diameter of 18 meters and a sidewall height of 8.5 meters, with approximately 6.75 meters being positioned below the water line. The sidewall is constructed of continuous wound and roved material bonded into a monolithic structure at the installation site. All fastenings and floatation are on the exterior of the tank in order to maintain a smooth interior surface. In a preferred embodiment, a steel ring (not shown) is positioned around the tank to stiffen the tank and absorb forces from currents in the body of water. Mooring points are also provided on the steel ring. Both the interior and exterior sidewall surfaces of the tank have a smooth, resin-rich layer which provides a slick surface that resists marine growth and improves water flow. Given the rigid construction of the tank 24, a water column having solid boundaries is provided for the aquatic animals, the boundaries remaining constant despite currents in the body of water. Unlike the present invention, prior art systems using net pens or bag enclosures are deformable by currents in the water, which causes the aquatic animals to move with the enclosure resulting in sickness, decreased eating, and death.

Figure 2:
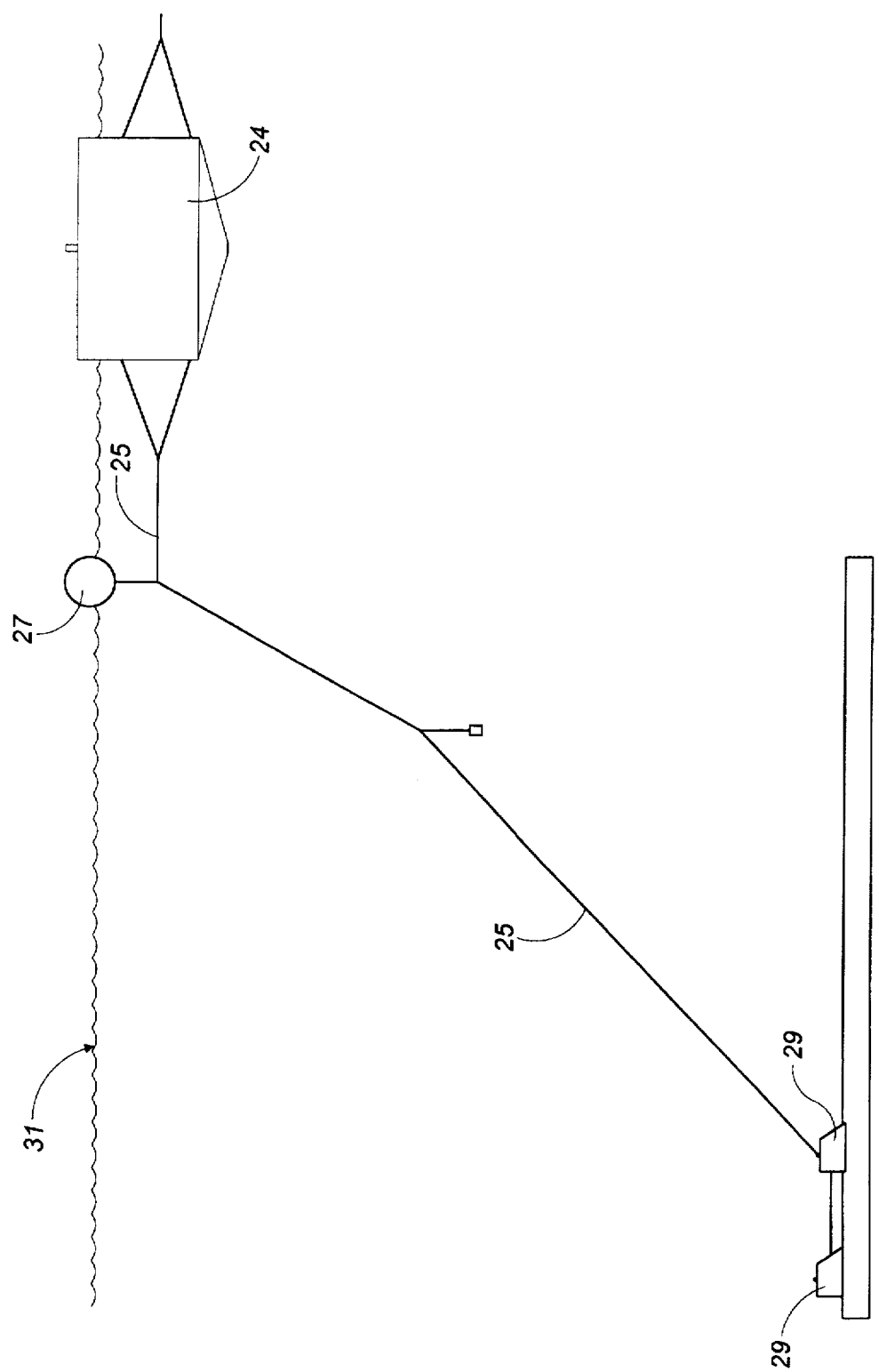
FIG. 2 is a schematic illustration of a mooring configuration for the aquaculture system of FIG. 1.

As illustrated in FIG. 2, the tanks 24 are moored in place using conventional mooring lines 25, mooring buoys 27, and anchors 29. It will be understood that the exact mooring configuration for the system will depend on the site, taking into account such things as currents, weather, bathymetry and desired layout of the system. The configuration in FIG. 2 is therefore merely illustrative, and does not indicate redundant moorings which are used to ensure that each tank is safely secured in place. As illustrated in FIG. 2, tanks 24 are partially submerged below sea level 31.

Figure 3:
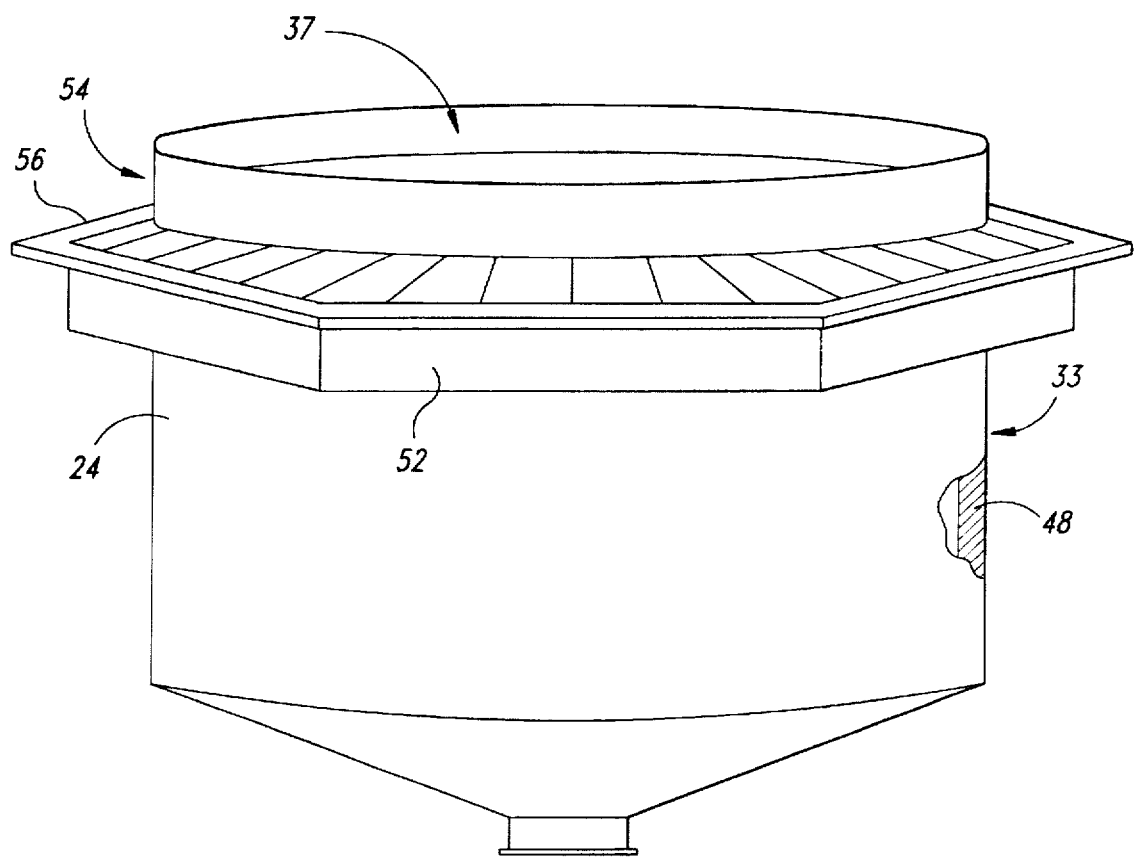
FIG. 3 is a front elevational view of a tank used in the aquaculture system of FIG. 1.
Figure 4B:
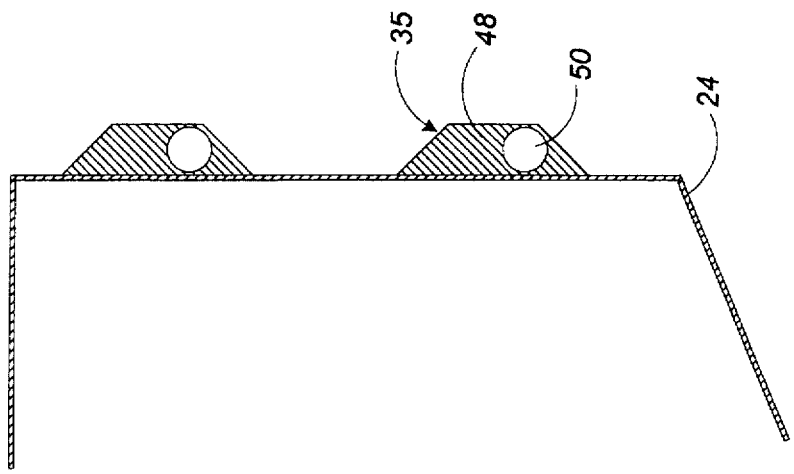
FIG. 4B is a cross-sectional elevational view taken along line 4B—4B of FIG. 4A.
Figure 4A:
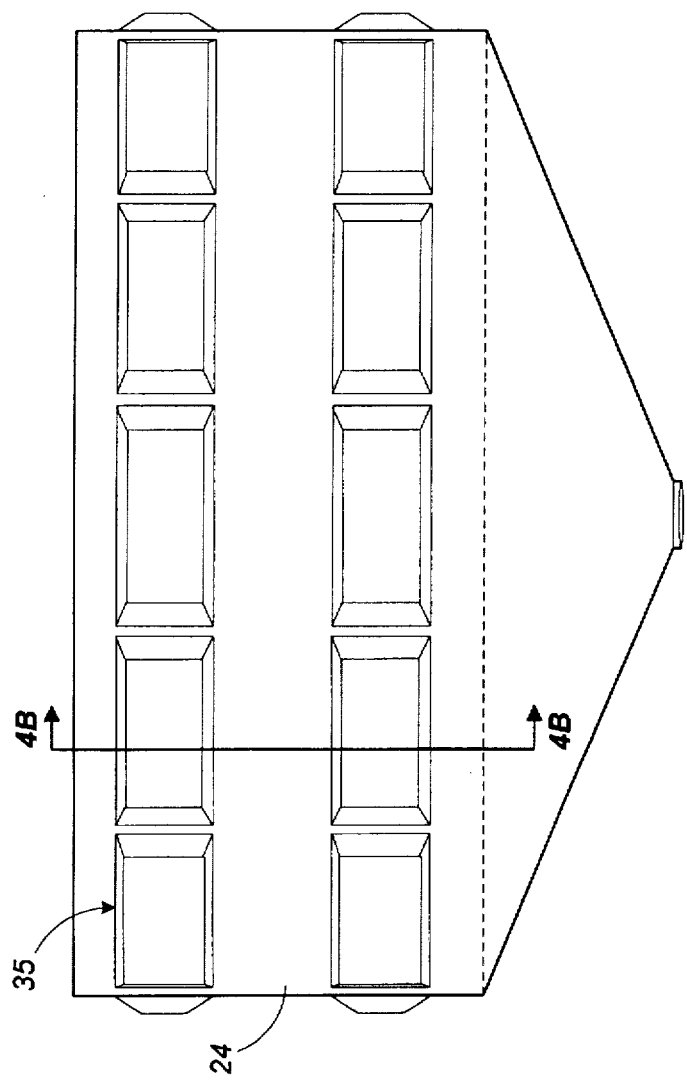
FIG. 4A is a front elevational view of a flotation configuration for the tank of FIG. 3.

The tanks 24 are rigid-walled members, and in a preferred embodiment, are fabricated from a woven and stranded fiberglass reinforced plastic resin composite material. As illustrated in FIG. 3, floatation for each tank is accomplished by molding a quantity of closed-cell foam 48 into the sidewalls 33. A quantity of closed-cell foam is also formed and fiberglassed into a ring 52 around an upper region 54 of tank 24. In an alternative embodiment, as illustrated in FIGS. 4A and 4B, sections 35 of closed-cell foam 48 are encased in fiberglass and permanently bonded to an exterior surface of the tank, each floatation section 35 containing an inflatable bladder 50 or other fillable containment device which may be inflated and deflated as necessary to position the tank at a selected depth in the body of water. In a preferred embodiment, a platform or walkway 56 is positioned on the top of the ring 52 in order to allow an operator to walk around the top of the tank.

Figure 5:
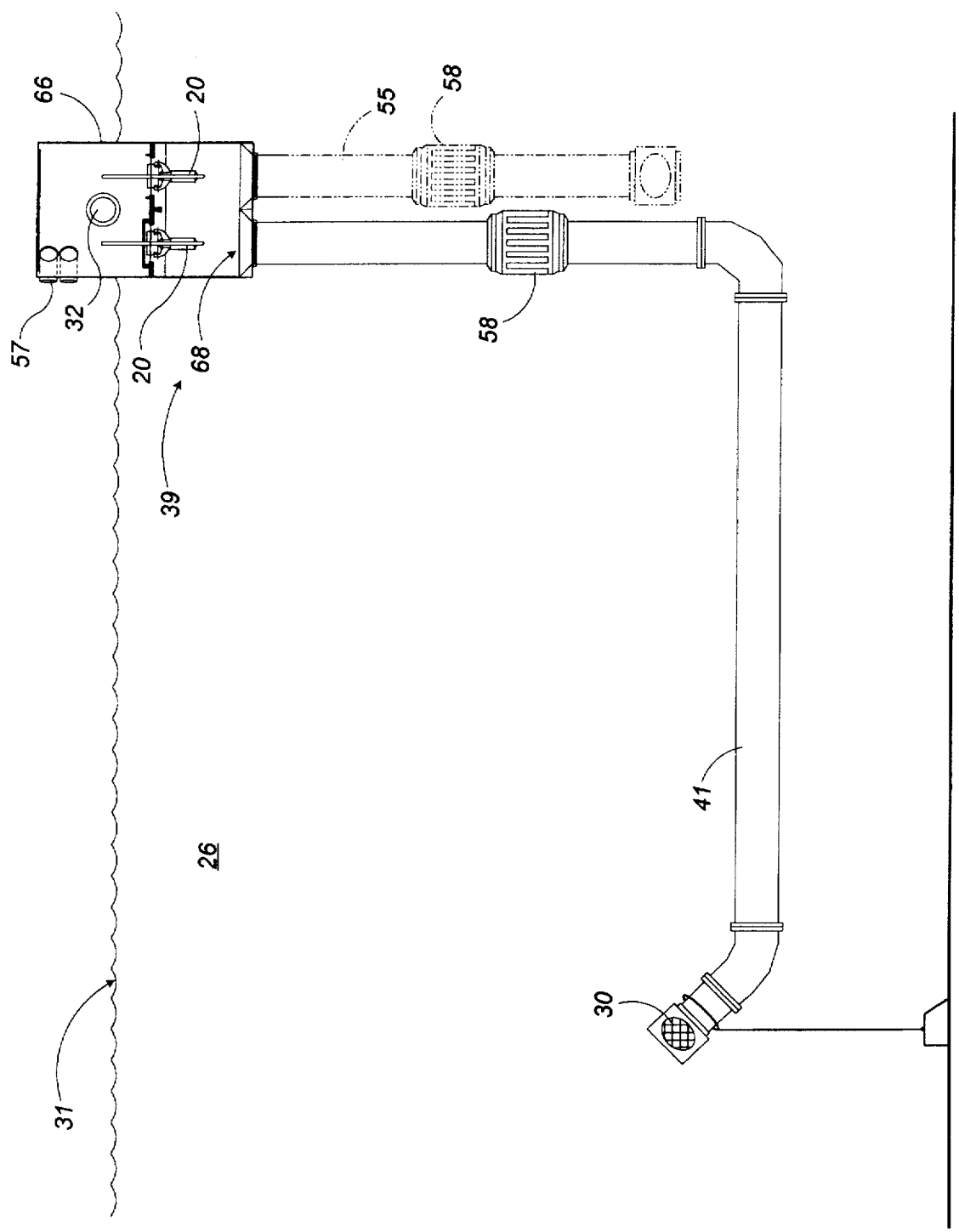
FIG. 5 is a partial cross-sectional right-side elevational view of a pump and water intake system used in the aquaculture system of FIG. 1.
Figure 6:
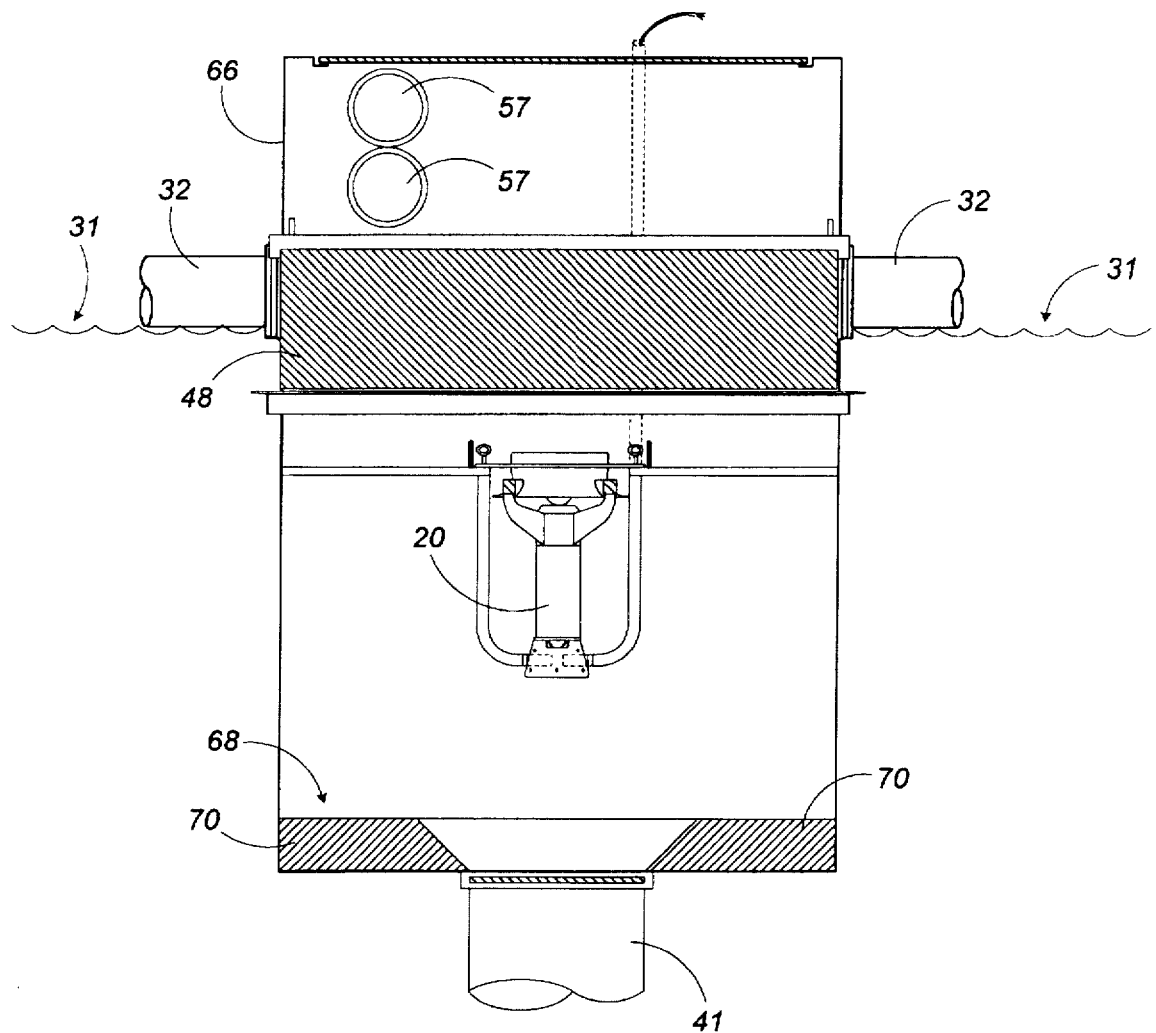
FIG. 6 is a cross-sectional front elevational view of a pump well used in the aquaculture system of FIG. 1.
Figure 7:
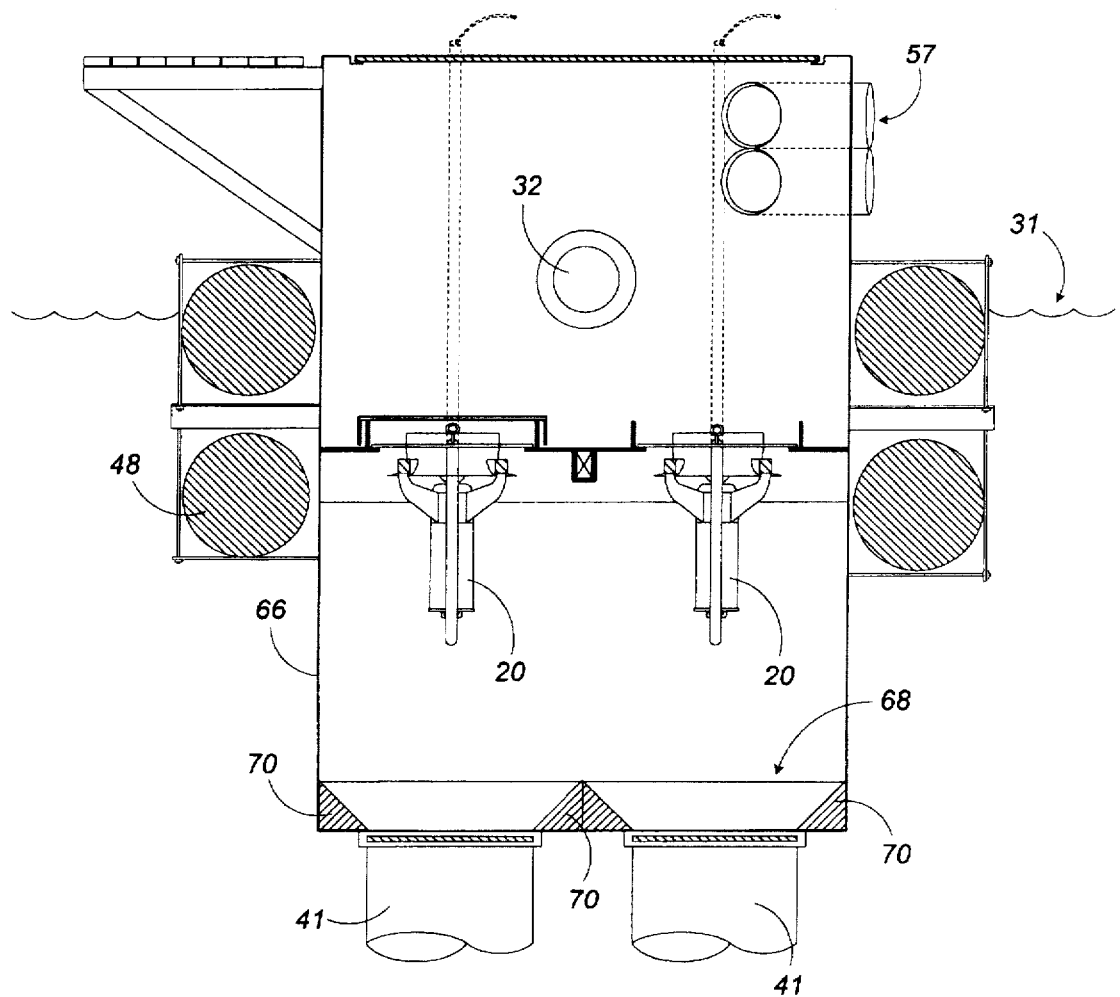
FIG. 7 is a cross-sectional right-side elevational view of the pump well of FIG. 8.

Water is provided to the interior 37 of the tank 24 via a pump assembly 39, comprising a pump 20 provided in a pump well 66, as illustrated in FIG. 5. The pump assembly 39 floats adjacent to the tank 24, and is partially submerged below sea level 31. Floatation may be achieved through any conventional method, although in a preferred embodiment, as illustrated in FIGS. 6 and 7, closed-cell foam 48 is bonded to an exterior surface of the pump well 66.

The pump assembly 39 is provided with an inlet 30 and an outlet 32, the pump assembly 39 drawing water in from the body of water 26 external to the tank 24, pumping it through the pump well 66 and discharging the water via the outlet 32 into the tank 24 to displace and discharge a volume of water from the tank. The inlet 30 is movable and may be positioned at a selected location and depth in the body of water external to the tank, the only limitation being the length of the flexible pipe 41 extending between the inlet 30 and the pump well 66. In an alternate embodiment, a plurality of inlets that are selectively opened are positioned along the length of the conduit. Therefore, by providing an aquaculture system in accordance with a preferred embodiment of the present invention, water may be drawn from different depths, such that water that is free of surface contaminants and that is at a selected temperature is provided to the tank. In an alternative embodiment, a second line 55 is coupled to the pump well 60 to draw water in from an alternative position and depth. As further illustrated in FIG. 5, the inlet 30 has screens to exclude large debris and reduce inlet flow velocity, and is moored in a desired location using anchors or weights.

By continuously introducing a volume of new water into the tank 24 and displacing and discharging a corresponding volume of water from the tank, the fish or other aquatic life are provided with a fresh supply of oxygenated water, and dissolved waste products such as ammonia are removed from the tank. The flow rate of water to the tank may be increased or decreased as necessary to maintain the oxygen concentration in the tank above a minimum acceptable level. The minimum acceptable oxygen concentration will depend on the species being grown. For example, Atlantic salmon require a minimum oxygen concentration of 5 mg per liter, and the oxygen concentration would therefore be maintained at 9.2–12.8 mg. per liter. A dissolved oxygen meter is used to measure the oxygen content of the overflow water and of the new water being provided to the tank. When the oxygen level in the overflow water reaches the lowest acceptable level, an operator can choose to either increase water flow or inject oxygen into the water being provided to the tank. In the case of a pump failure, the operator will manually start oxygen injection into the tanks. The flow rate of water to the tank may be adjusted via valves positioned between the pump well 66 and the tanks 24. (It will be understood that the system may also be fully automated using microprocessor controlled sensors and valves.) The pump well 66 acts as a plenum chamber which allows the characteristics of the water, such as oxygen content and temperature, to be monitored and altered as desired, prior to being discharged into the tank.

In a preferred embodiment, as illustrated in FIG. 5, an oxygen diffuser 58 is submerged and coupled to the conduit 41 to inject oxygen into the water as it is drawn towards the pump 20. The oxygen diffuser is coupled to a source of oxygen, for example, an oxygen generator or bottles of liquid oxygen, provided on the service platform 21. By injecting the oxygen into pressurized sea water, a higher absorption efficiency is achieved.

In an alternative embodiment, an oxygen diffuser 58 is coupled to the conduit 59 extending between the outlet 32 of the pump assembly and the tank 24, to inject oxygen into the water prior to it being discharged into the tank. This arrangement allows the oxygen level to be controlled for the particular tanks, given that in a preferred embodiment, a single pump assembly 39 selectively provides water to more than one tank. As a redundancy, in the event that the pump 20 fails, a supplementary oxygen diffuser may be positioned in the tank 24 to provide oxygen to the aquatic animals. In an alternative embodiment, aeration of the water is accomplished by directly injecting air into the tanks via air lift pumps. It will be understood that the injection of oxygen into the water may also be done to stimulate feeding and growth as is known in the art.

As further illustrated in FIGS. 6 and 7, a bottom region 68 of the pump well 66 is provided with baffles 70, thereby reducing cavitation as water flows through the pump well. Although it is believed that acceptable results are achieved when the baffles are provided at an angle of 15°–50°, manufacturing costs are reduced by using a baffle of 45°. It will be understood that the pump well may be configured to accommodate one or more pumps, although in a preferred embodiment, each pump well contains a pump 20, and each pump well provides water to two tanks 24. Although a variety of pumps may be used, in a preferred embodiment, a submersible pump manufactured by ITT Flygt, Model PP-4670 is used, each pump having a maximum flow rate of 12,000 gallons per minute. The pump well 66 also has at least one overflow valve 57 to discharge excess water from the pump well when the tank 24 is operating at a low flow rate.

Figure 8:
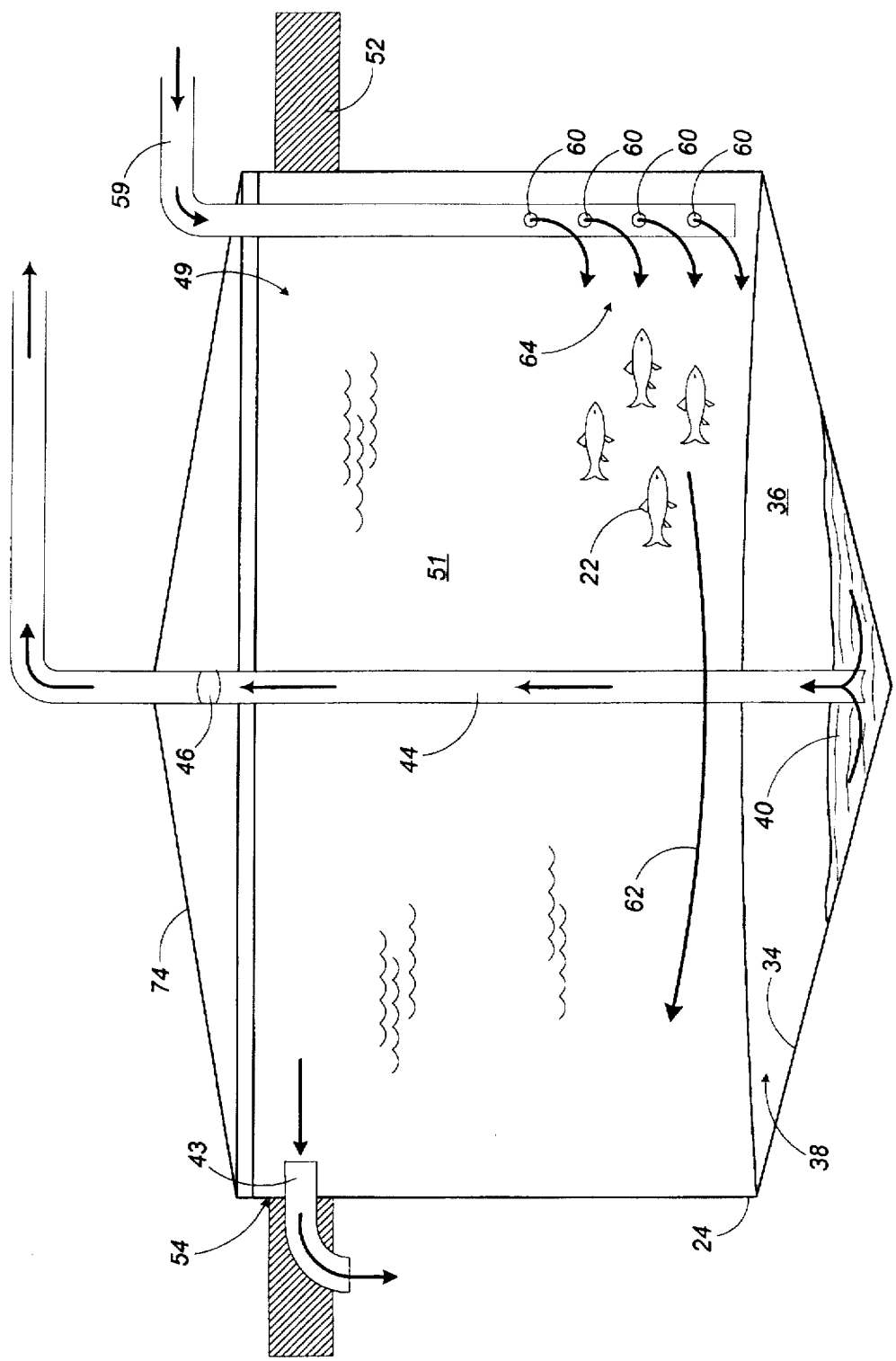
FIG. 8 is a cross-sectional front elevational view of the tank of FIG. 3.

As illustrated in FIG. 8, the water from the pump assembly is discharged into the tank 24 via a plurality of vertically spaced nozzles 60 provided in a lower region 64 of the tank. As a result, a circular current indicated by reference arrow 62 is created in the tank, the speed of which is variable via valves coupled to the pump well 66 and tanks 24, to force the fish to exercise, yet which assists the fish in schooling in a nonstressful environment. The appropriate current speed will depend on the species being grown; for example, the desired current speed for Atlantic salmon is 0.5–1.5 fish lengths per second, the length of the fish varying from smolts to adult, harvestable fish. The current speed is adjustable by varying the flow rate from the pump or the angle of water flow into the region 64. For example, for Atlantic salmon, the flow rate of water to the tank may vary from 400 gpm–6700 gpm, depending on the oxygen demand and desired current velocity.

Figure 9:
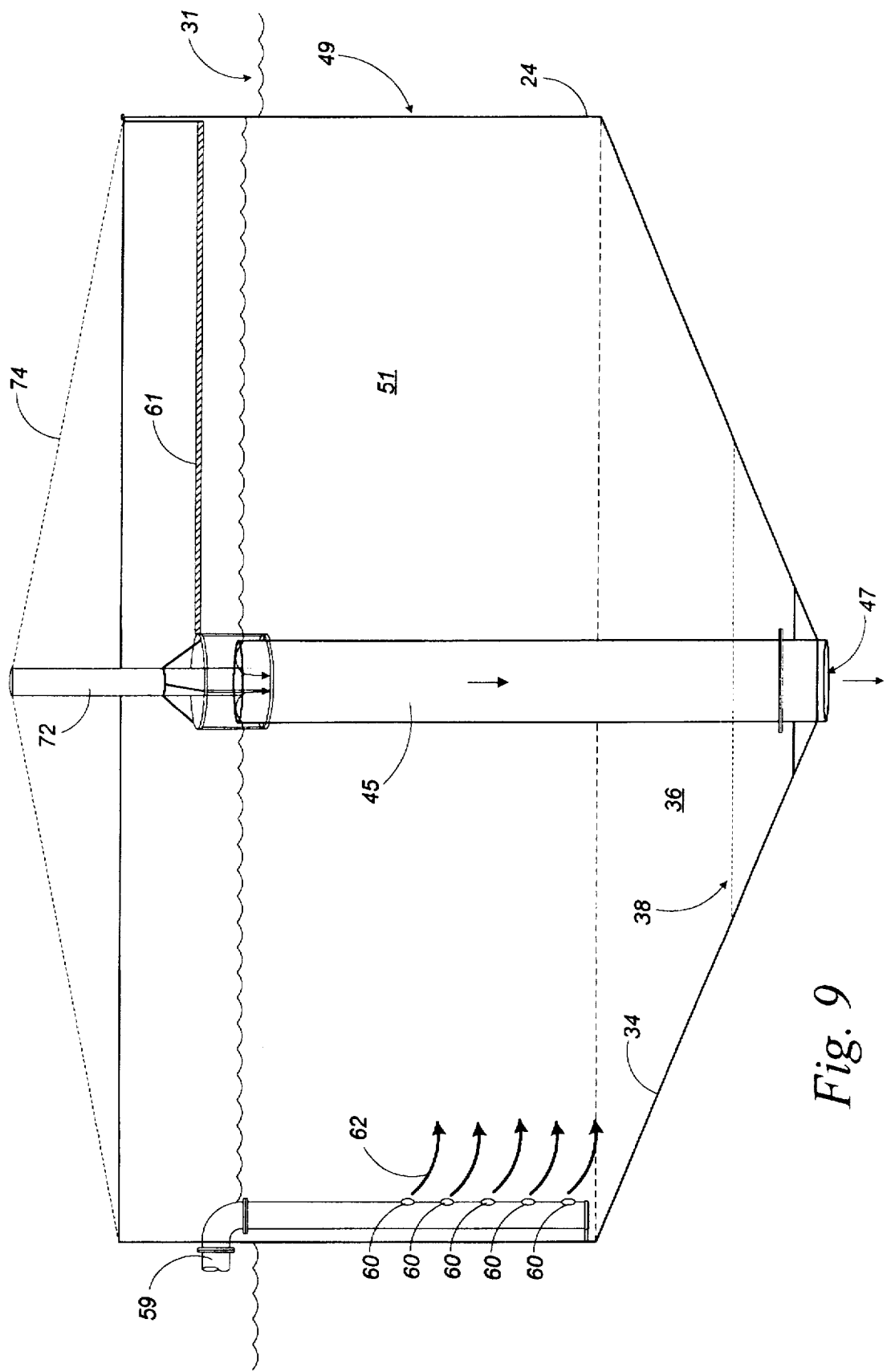
FIG. 9 is a cross-sectional elevational view of an alternative embodiment of a tank to be used in the aquaculture system of FIG. 1.

In a preferred embodiment illustrated in FIG. 8, the water in the tank displaced by the introduction of new water from the pump assembly, exits the tank 24 via conduits 43 positioned around the perimeter of the upper region 54 of the tank. In an alternative embodiment, as illustrated in FIG. 9, the displaced water spills over the top of central conduit 45 which it flows through to be discharged via outlet 47 provided in the bottom of the tank. By introducing new water in the lower region 64 of the tank and removing water from the upper region 54, mixing and movement of the water in a circular path is enhanced. By removing water from around the perimeter of the tank, it is believed that better skimming is achieved.

As further illustrated in FIGS. 8 and 9, the tank has a cylindrical section 49 that forms a primary zone 51 in which the fish 22 or other species live and grow. The tank 24 is further provided with a conical bottom surface 34 which creates a quiet zone 36 beneath the primary zone 51 in a bottom region 38 of the tank. The conical bottom surface 34, together with the circular current 62, cause solid waste 40 to collect in the zone 36.

Figure 10:
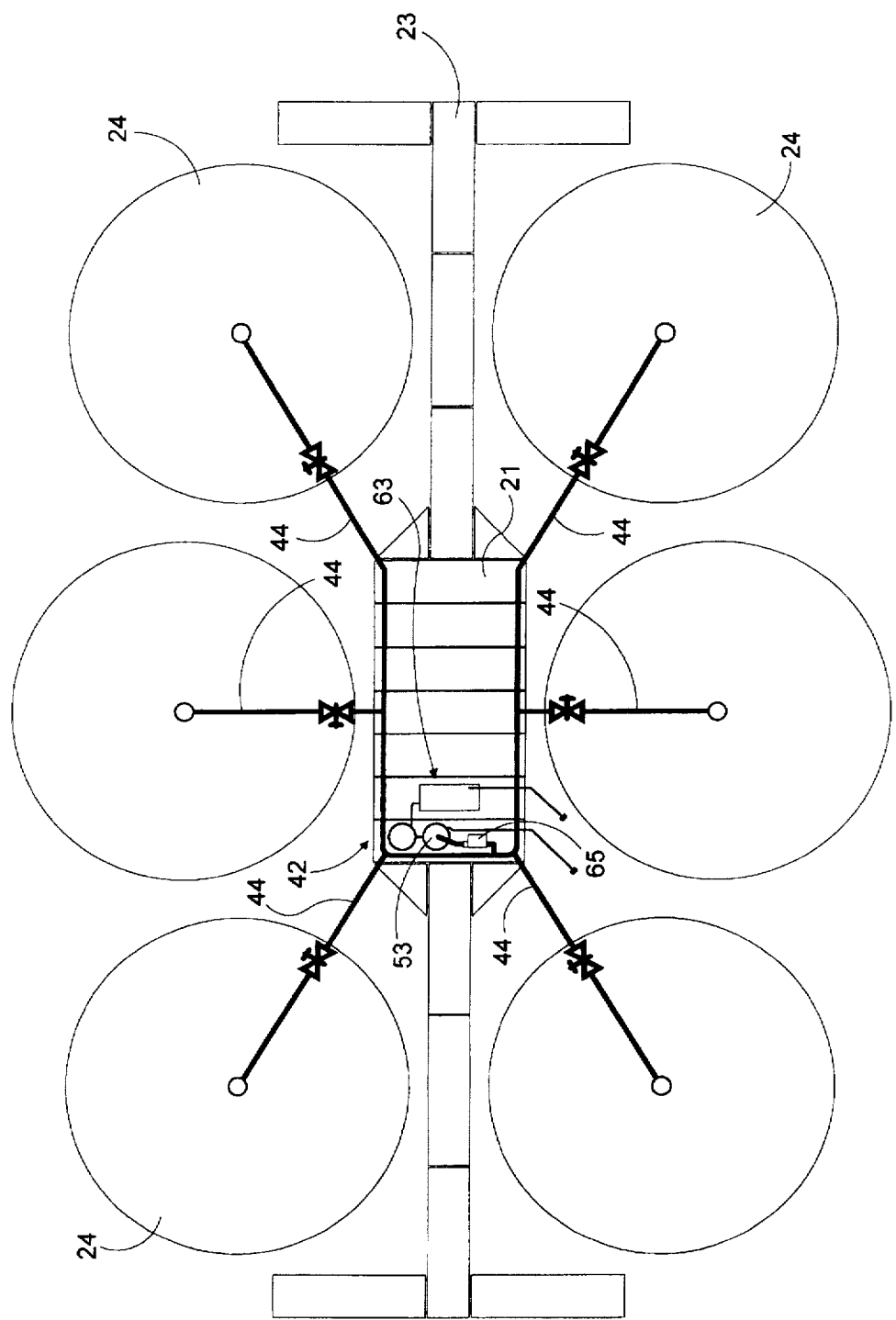
FIG. 10 is a schematic illustration of a top elevational view of a solid waste collection system forming a part of the aquaculture system of FIG. 1.

In a preferred embodiment, a waste collection system 42 is provided, as illustrated in FIGS. 8 and 10. The solid waste is evacuated from the zone 36 by suction pump 65 via a conduit 44 that extends from the bottom region of the tank to a collection tank 53, from which the waste may be discharged into the body of water. Alternatively, the solid waste may be treated by any conventional waste treatment apparatus 63, prior to being discharged into the body of water. For example, a ship type, U.S. Coast Guard approved, IMO certified type II, marine sanitation device, such as the Omnipure™ 15MXPM may be used. Treated solid waste may also be retained for use such as fertilizer or feed stock for other species. As illustrated in FIG. 8, the conduit 44 is provided with a transparent region 46 through which the waste may be viewed as it flows through the conduit. If uneaten feed is detected in the solid waste, the distribution of feed to the tanks may be stopped. (It should be noted that any conventional feed spreader may be used in the aquaculture system of the present invention.)

Figure 11:
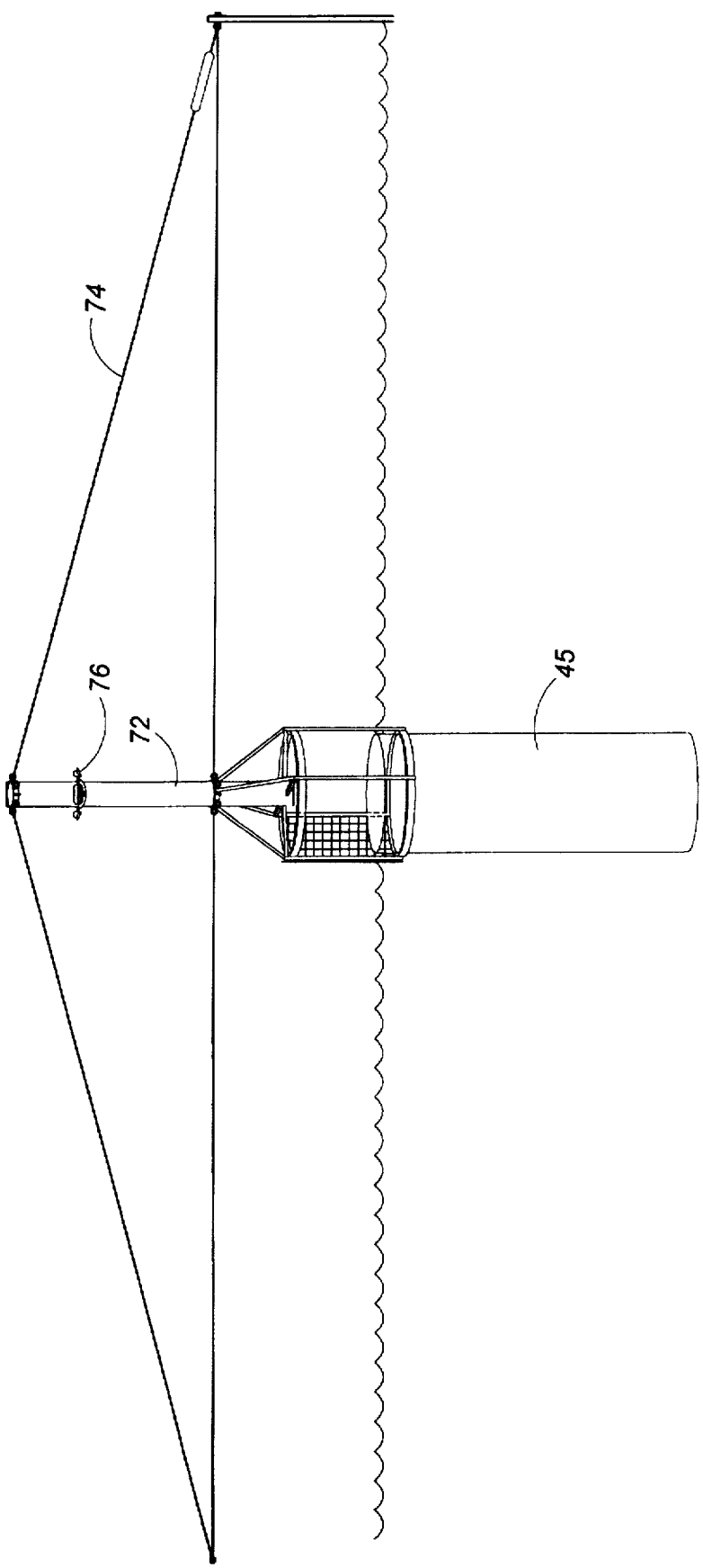
FIG. 11 is a front elevational view of a mast structure forming a part of the aquaculture system of FIG. 1.

As illustrated in FIG. 11, a mast 72 extends out of the tank 24 above the central conduit 45 to a height above the tank. The mast 72 provides anchor points for a tank cover 74 which may be a solid fiberglass dome, netting, or any other desired material. The mast 72 may also support one or more catwalks 61, or photo period lighting 76, as desired.

Figure 12:
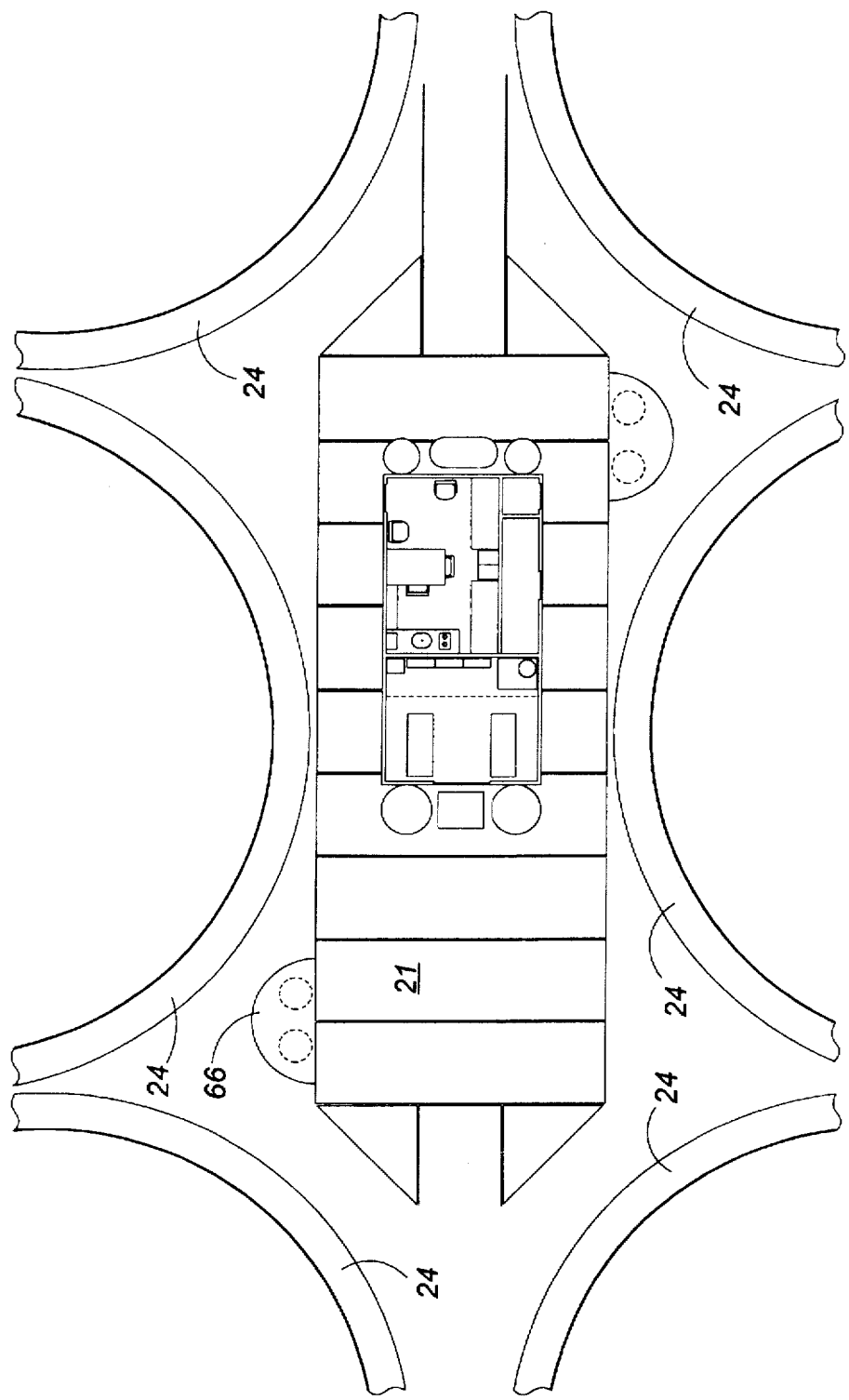
FIG. 12 is a top plan view of a service platform forming a part of the aquaculture system of FIG. 1.

As illustrated in FIG. 12, the various components of the aquaculture system are supported by the service platform 21, which houses fuel, generators, oxygen, waste tanks, waste treatment facilities, and housing for personnel, as desired. The aquaculture system is therefore self-contained, and may be positioned at any desired location. The tanks 24 define isolated regions which allow an operator to control the environment in each tank and prevent the spread of disease, unlike an open system. Also, unlike traditional closed systems, the aquaculture system of the present invention draws clean water at a selected temperature into the tank to provide oxygenated water and flush out dissolved waste, without relying on recirculation and filters.

Figure 13:
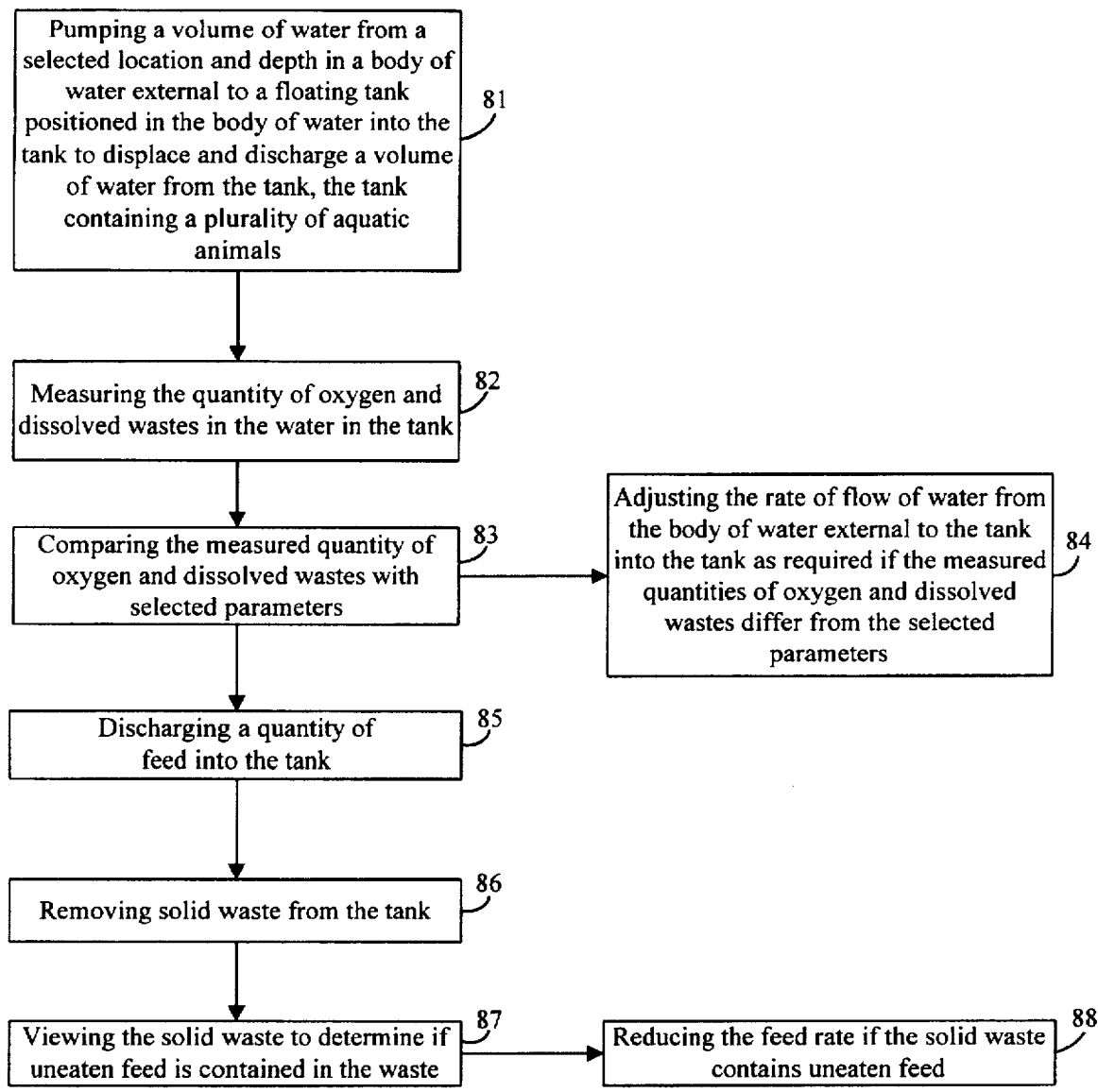
FIG. 13 is a diagram illustrating the steps of a preferred embodiment of the present invention.

Fish or other aquatic animals may therefore be grown in accordance with a preferred embodiment of the present invention, by placing the aquatic animals in a floating tank that is positioned in a body of water and that contains a volume of water pumped from the body of water external to the tank. As illustrated in FIG. 13, a volume of water is pumped from a selected location and depth in the body of water external to the tank, into the tank, step 81, thereby displacing and discharging a volume of water from the tank.

The levels of oxygen and dissolved wastes in the water in the tank are measured, step 82, and compared to desired values, step 83, the rate of flow of the water to the tank being adjusted as necessary to deliver more oxygen and decrease dissolved waste levels, by increasing the exchange rate, step 84. Once oxygen and dissolved waste parameters are within acceptable ranges, the flow rate may be reduced. A quantity of feed is discharged into the tank, step 85, and solid wastes are removed from the tank, step 86. As the solid waste is removed, it is examined to determine if uneaten feed is contained in the waste, step 87, the rate of feed distribution being reduced or stopped if uneaten feed is detected in the solid waste, step 88.

An improved aquaculture system for growing aquatic animals such as fish has been shown and described. From the foregoing, it will be appreciated that, although embodiments of the invention have been described herein for purposes of illustration, various modifications may be made without deviating from the spirit and scope of the invention. Thus, the present invention is not limited to the embodiments described herein, but rather is defined by the claims which follow.

I claim:

1. An aquaculture system for growing aquatic animals comprising:

a floating tank having a rigid-wall and being positioned in a body of water; and a pump assembly having an inlet coupled to a pump well, the pump well having an outlet coupled to the tank, the inlet being provided in the body of water external to the tank, the pump assembly drawing water in through the inlet, through the pump well and discharging the water via the outlet into the tank to displace and discharge a volume of water from the tank, the inlet being movable and selectively positioned at a desired location and depth in the body of water external to the tank, such that water that is free of surface contaminants and that is at a selected temperature is provided to the tank, the rate of flow of water to the tank being variable via a valve coupled to the pump well.

2. The aquaculture system according to claim 1 wherein the tank has a conical bottom surface to create a zone in a bottom region of the tank wherein solid waste collects.

3. The aquaculture system according to claim 2, further comprising:

a waste collection system having a conduit extending from the zone in the bottom region of the tank to a location exterior to the tank, the waste being evacuated from the tank via the conduit, the conduit having a transparent region such that the waste may be viewed as it flows through the conduit.

4. The aquaculture system according to claim 1 wherein a quantity of closed-cell foam and a bladder is coupled to the tank to float the tank, the tank being positioned at a selected depth in the body of water by inflating and deflating the bladder as required.

5. The aquaculture system according to claim 4 wherein a quantity of the closed-cell foam forms a ring around a top region of the tank and a platform is coupled to the ring.

6. The aquaculture system according to claim 1 wherein a conduit extends between the inlet and the pump well, and an oxygen diffuser is submerged and coupled to the conduit to inject oxygen into the water as it is drawn towards the pump well.

7. The aquaculture system according to claim 1 wherein an oxygen diffuser is coupled to a conduit extending between the outlet of the pump well and the tank to inject oxygen into the water before it is discharged into the tank.

8. The aquaculture system according to claim 1 wherein the outlet of the pump well is coupled to a plurality of vertically spaced nozzles provided in the tank, the water being discharged into the tank via the nozzles to create a circular current.

9. The aquaculture system according to claim 8 wherein the nozzles are provided in a lower region of the tank and the displaced volume of water is discharged from an upper region of the tank.

10. The aquaculture system according to claim 9 wherein the displaced volume of water is discharged from an upper region of the tank via a plurality of conduits provided around the perimeter of the upper region of the tank.

11. The aquaculture system according to claim 1 wherein a plurality of the floating tanks are coupled together adjacent a floating platform.

12. The aquaculture system according to claim 1 wherein baffles are positioned in a bottom region of the pump well to reduce cavitation as the water flows through the pump well.

13. The aquaculture system according to claim 1 wherein a mast extends upward from the tank to a height above the tank, the mast providing an anchor for a cover extending over the tank.

14. An aquaculture system for growing aquatic animals comprising:

a rigid-walled floating tank provided in a body of water;

a pump assembly having an inlet coupled to a pump well and an outlet, the inlet being provided in a body of water external to the tank, the pump assembly drawing water in through the inlet, through the pump well and discharging the water via the outlet into the tank to displace and discharge a volume of water from the tank, wherein the inlet is movable and selectively positioned at a desired location and depth in the body of water external to the tank such that water that is free of surface contaminants and that is at a selected temperature is provided to the tank;

apparatus for distributing feed to a plurality of aquatic animals positioned in the tank; and a waste collection system for removing solid waste from the tank.

15. The aquaculture system according to claim 14 wherein a conduit extends between the inlet and the pump well, and an oxygen diffuser is submerged and coupled to the conduit to inject oxygen into the water as it is drawn towards the pump well.

16. The aquaculture system according to claim 14 wherein an oxygen diffuser is coupled to a second conduit extending between the outlet of the pump assembly and the tank to inject oxygen into the water before it is discharged into the tank.

17. The aquaculture system according to claim 14 wherein the outlet of the pump assembly is coupled to a plurality of vertically spaced nozzles provided in the tank, the water being discharged into the tank via the nozzles to create a circular current.

18. An aquaculture system for growing aquatic animals comprising:

a floating tank having a rigid-wall and being positionable in a body of water; and a pump assembly having an inlet coupled to a pump well and an outlet, the pump assembly being adapted to float in the body of water, the inlet being provided in the body of water external to the tank when the pump assembly is placed in the body of water, the pump assembly being adapted to draw water in through the inlet, through the pump well and discharge the water via the outlet into the tank at a variable, selected flow rate to displace and discharge the volume of water from the tank when the tank and pump assembly are positioned in the body of water, the inlet being movable and selectively positioned at a desired location and depth in the body of water external to the tank, such that water that is free of surface contaminants and that is at a selected temperature is provided to the tank.

19. The aquaculture system according to claim 18 wherein the tank is provided with a conical bottom surface.

20. The aquaculture system according to claim 18 wherein baffles are positioned in a bottom region of the pump well to reduce cavitation when the pump assembly is positioned in the body of water and water flows through the pump well.

21. A method for growing aquatic animals comprising the steps of:

pumping a volume of water from a selected location and depth in a body of water external to a floating tank positioned in the body of water, into the tank to displace and discharge a volume of water from the tank, the tank containing a plurality of aquatic animals;

measuring the quantity of oxygen and dissolved wastes in the water in the tank;

comparing the measured quantity of oxygen and dissolved wastes with selected parameters; and adjusting the rate of flow of water from the body of water external to the tank into the tank as required if the measured quantities of oxygen and dissolved wastes differ from the selected parameters.

22. The method according to claim 21, further comprising:

discharging a quantity of feed into the tank;

removing solid waste from the tank;

viewing the solid waste to determine if uneaten feed is contained in the waste; and reducing the feed rate if the solid waste contains uneaten feed.

* * * * *